United States Patent [19]
Blomgren

[11] Patent Number: 5,598,546
[45] Date of Patent: Jan. 28, 1997

[54] DUAL-ARCHITECTURE SUPER-SCALAR PIPELINE

[75] Inventor: James S. Blomgren, San Jose, Calif.

[73] Assignee: Exponential Technology, Inc., San Jose, Calif.

[21] Appl. No.: 298,583

[22] Filed: Aug. 31, 1994

[51] Int. Cl.[6] .................................................. G06F 9/30
[52] U.S. Cl. .................................... 395/385; 395/800
[58] Field of Search ...................................... 395/375, 800

[56] References Cited

U.S. PATENT DOCUMENTS

| | | | |
|---|---|---|---|
| 3,764,988 | 10/1973 | Onishi ...................................... | 395/375 |
| 4,893,233 | 1/1990 | Denman et al. ........................... | 395/375 |
| 4,992,934 | 2/1991 | Portanova et al. ....................... | 395/375 |
| 5,088,030 | 2/1992 | Yoshida .................................... | 364/275 |
| 5,193,156 | 3/1993 | Yoshida et al. .......................... | 395/375 |
| 5,241,635 | 8/1993 | Papadopoulos et al. ................ | 395/375 |
| 5,283,874 | 2/1994 | Hammond ................................ | 395/375 |
| 5,287,467 | 2/1994 | Blaner et al. ............................ | 395/375 |
| 5,299,321 | 3/1994 | Iizuka ...................................... | 395/375 |
| 5,307,504 | 4/1994 | Robinson et al. ....................... | 395/800 |
| 5,355,460 | 10/1994 | Eickemeyer et al. ................... | 395/375 |
| 5,398,321 | 3/1995 | Jeremiah ................................. | 395/375 |
| 5,430,851 | 7/1995 | Hirata et al. ............................. | 395/375 |
| 5,438,668 | 8/1995 | Coon et al. .............................. | 395/375 |
| 5,448,764 | 9/1995 | Eickemeyer et al. ................... | 395/800 |

Primary Examiner—William M. Treat
Assistant Examiner—Saleh Najjar
Attorney, Agent, or Firm—Stuart T. Auvinen

[57] ABSTRACT

A dual-instruction-set processor processes instructions from two or more instruction sets. The processor has several pipelines for processing different types of operations—Memory, ALU, and Branch operations. Instructions are decoded by RISC and CISC instruction decoders which generate control words for the pipelines. The control words are encoded by the operation to be performed by the pipelines, which can overlap for the instruction sets. A different format for the control word is used for each pipeline, but the format is the same for all instruction sets. Once the control words are generated and sent to the pipelines, an indication of the instruction set is no longer needed. Thus instructions from several instruction sets may be freely mixed in the pipelines, and there is no need to flush the pipelines when the instruction set is switched. Register operands are first converted to their RISC equivalents by the instruction decoders so that bypass and interlock logic may detect dependencies between instructions from any instruction set. Pipeline valid bits encode the order that instructions were in, allowing dependencies to exist within a group of instructions at the same stage in the pipelines. A dispatcher can decode and dispatch up to three instructions in a single clock cycle, although the third instruction dispatched can only be a simple branch. Compound instructions may require more than one pipeline for processing, and two or more control words are generated for these complex instructions, with one control word sent to each pipeline.

21 Claims, 3 Drawing Sheets

DUAL-ARCHITECTURE SUPER-SCALAR PIPELINE

RELATED APPLICATION

This application is related to application for a "Dual-Instruction-Set Architecture CPU with Hidden Software Emulation Mode", filed Jan. 11, 1994, U.S. Ser. No. 08/179,926, hereby incorporated by reference. This application is also related to application for a "Pipeline with Temporal Re-Arrangement of Functional Units for Dual-Instruction-Set CPU", filed Jan. 11, 1994, U.S. Ser. No. 08/180,023, abandoned, FWC No. 08/361,017 was filed in place of it, now U.S. Pat. No. 5,542,059, hereby incorporated by reference. This application is further related to application for a "Shared Register Architecture for a Dual-Instruction-Set CPU", filed Jul. 20, 1994, U.S. Ser. No. 08/277,962, now U.S. Pat. No. 5,481,693, hereby incorporated by reference and to application for a "Dual-Architecture Exception and Branch Prediction using a Fault-Tolerant Target Finder Array", filed Aug. 31, 1994, U.S. Ser. No. 08/298,778, hereby incorporated by reference. These related applications have a common inventor and are assigned to the same assignee as the present application.

BACKGROUND OF THE INVENTION

1. Field of the Invention

This invention relates to computer systems, and more particularly to pipelines executing more than one instruction set.

2. Description of the Related Art

Modern central processing units (CPU's) employ a pipeline which allow several instructions to be processed at one time. Each stage of the pipeline performs a function in executing or processing an instruction. Instructions generally enter the pipeline and complete the pipeline one at a time, since each stage can hold just one instruction.

Super-scalar CPU's have more than one pipeline. Thus, a CPU with two pipelines can have two instructions enter and complete the pipelines at a time. The maximum throughput of instructions is effectively doubled.

DUAL-INSTRUCTION-SET PROCESSOR

Processors, or CPU's, that are capable of executing instructions from two separate instruction sets are highly desired at the present time. For example, a desirable processor would execute user applications for the x86 instruction set and the PowerPC™ instruction set. It would be able to execute the tremendous software base of x86 programs that run under the DOS™ and WINDOWS™ operating systems from Microsoft of Redmond, Wash., and it could run future applications for PowerPC™ processors developed by IBM, Apple, and Motorola.

Such a processor is described in the related application for a "Dual-Instruction-Set Architecture CPU with Hidden Software Emulation Mode", filed Jan. 11, 1994, U.S. Ser. No. 08/179,926, pending. That dual-instruction-set CPU has a pipeline which is capable of executing instructions from either a complex instruction set computer (CISC) instruction set, such as the x86 instruction set, or from a reduced instruction set computer (RISC) instruction set, such as the PowerPC™ instruction set.

Two instruction decode units are provided so that instructions from either instruction set may be decoded. Two instruction decoders are required when the instruction sets are separate because the instruction sets each have a substantially independent encoding of operations to opcodes. For example, both instruction sets have an ADD operation or instruction. However, the binary opcode number which encodes the ADD operation is different for the two instruction sets. In fact, the size and location of the opcode field in the instruction word is also different for the two instruction sets. In the x86 CISC instruction set, the opcode 03 hex is the ADD r,v operation or instruction, for a long operand. This same opcode, 03 hex, corresponds to a completely different instruction in the PowerPC™ RISC instruction set. In CISC the 03 hex opcode is an addition operation, while in RISC the 03 hex opcode is TWI—trap word immediate, a control transfer instruction. Thus two separate decode blocks are necessary for the two separate instruction sets.

Switching from the CISC instruction set to the RISC instruction set may be accomplished by a far jump or branch instruction, while a return from interrupt can switch back to the CISC instruction set. Rapid execution of these branches is desirable since it is anticipated that these switches between instruction sets will frequently be encountered.

It is therefore desired to execute instructions from both instruction sets in the same pipelines, rather than have separate, redundant, pipelines for each instruction set. When an instruction is encountered causing a switch between the instruction sets, it is desired to avoid purging the pipelines but to continue execution in the new instruction set. Thus the pipelines must be able to contain instructions from two or more instructions sets at the same time.

SUMMARY OF THE INVENTION

A central processing unit (CPU) processes instructions from two separate instruction sets. This is possible because the CPU comprises a RISC instruction decode means for decoding instructions from a RISC instruction set, and a CISC instruction decode means for decoding instructions from a CISC instruction set. The RISC instruction set has a first encoding of operations, while the CISC instruction set has a second encoding of operations. The first encoding of operations is substantially independent from the second encoding of operations.

An instruction set indicating means is for indicating an instruction set to be decoded. The instruction set indicating means has a RISC state indicating that the RISC instruction set be decoded and a CISC state indicating that the CISC instruction set be decoded. A select means is coupled to the RISC instruction decode means and the CISC instruction decode means and outputs a control word. The control word is generated from a decoding of an instruction from the RISC instruction set by the RISC instruction decode means when the instruction set indicating means is in the RISC state. However, the control word is generated from a decode of an instruction from the CISC instruction set by the CISC instruction decode means when the instruction set indicating means is in the CISC state.

The control word has a third encoding of operations to control words which is related to but substantially different from the first encoding and the second encoding. An execute means is coupled to the select means and receives the control word. The execute means executes an operation decoded by the RISC instruction decode means when the instruction set indicating means is in the RISC state, but the execute means executes an operation decoded by the CISC instruction decode means when the instruction set indicating means is in the CISC state.

Thus instructions from both the RISC instruction set and the CISC instruction set are decoded into control words which are executed by the CPU.

In further aspects of the invention the execute means comprises a plurality of pipelines. Each pipeline in the plurality of pipelines comprises a sequence of stages, and each pipeline executes a subset of operations encoded by the RISC instruction set and a subset of operations encoded by the CISC instruction set. Each pipeline is responsive to a particular format of the control word.

In other aspects of the invention the select means generates the control word and a secondary control word when a compound instruction is decoded. The compound instruction encodes two operations, a primary operation and a secondary operation. The plurality of pipelines comprises a first pipeline which receives the control word. The first pipeline executes the primary operation indicated by the control word. A second pipeline receives the secondary control word and executes the secondary operation indicated by the secondary control word.

In still further aspects of the invention the RISC instruction decode means and the CISC instruction decode means comprise a first decoder. A second decoder decodes a second instruction which encodes a second operation. The second decoder also has a RISC instruction decode means for decoding RISC instructions and a CISC instruction decode means for decoding CISC instructions. The second decoder outputs a second control word encoding an operation of a RISC instruction when the instruction set indicating means is in the RISC state, but the second control word encodes an operation of a CISC instruction when the instruction set indicating means is in the CISC state.

A dispatch means allocates the plurality of pipelines. A pipeline valid array is loaded by the dispatch means and indicates valid instructions in the plurality of pipelines. When the CPU has a floating point pipeline, the dispatch means allocates both the floating point pipeline and the first pipeline for ALU operations to a floating point instruction decoded by the first decoder. The plurality of pipelines also has a third pipeline for executing a third subset of operations. This third subset of operations comprises operations encoded by the RISC instruction set and operations encoded by the CISC instruction set.

The invention uses several pipelines that can each execute both RISC and CISC instructions. Several instruction decoders decode both RISC and CISC instructions even during the same clock cycle. Thus both RISC and CISC instructions can be dispatched to the shared pipelines. The instructions are decoded into control words which are related to but substantially different from the two instruction sets but depend upon the operation to be performed by the pipelines. The control words allow the pipelines and bypass logic to be independent of the instruction set of the decoded instructions.

DETAILED DESCRIPTION

Figure 1:
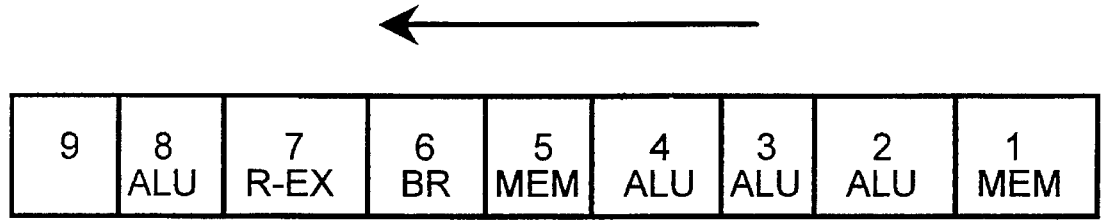
FIG. 1 shows a stream of instructions to be processed.

The present invention relates to an improvement in computer systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

This application is related copending application for a "Dual-Instruction-Set Architecture CPU with Hidden Software Emulation Mode", filed Jan. 11, 1994, U.S. Ser. No. 08/179,926, pending, hereby incorporated by reference. This application is also related to copending application for a "Pipeline with Temporal Re-Arrangement of Functional Units for Dual-Instruction-Set CPU", filed Jan. 11, 1994, U.S. Ser. No. 08/180,023, abandoned, Ser. No. 08/361,017 was filed in place of it, hereby incorporated by reference. This application is further related to copending application for a "Shared Register Architecture for a Dual-Instruction-Set CPU", filed Jul. 20. 1994, U.S. Ser. No. 08/277,962, now U.S. Pat. No. 5,481,693, hereby incorporated by reference and to copending application for a "Dual-Architecture Exception and Branch Prediction using a Fault-Tolerant Target Finder Array", filed Aug. 31, 1994, U.S. Ser. No. 08/298,778, hereby incorporated by reference. These related applications have a common inventor and are assigned to the same assignee as the present application. Reduced instruction set computer (RISC) and complex instruction set computer (CISC) instructions may both be executed in the dual-instruction-set central processing unit (CPU).

A dual-architecture central processing unit (CPU) is capable of operating in three modes—RISC mode, CISC mode, and emulation mode. A first instruction decoder decodes instructions when the processor is in RISC mode, while a second instruction decoder decodes instructions while the processor is in CISC mode. Two instruction decoders are needed since the RISC and CISC instruction sets have a substantially independent encoding of instructions or operations to binary opcodes.

The third mode of operation, emulation mode, also uses the first instruction decoder for RISC instructions, but emulation mode executes a superset of the RISC instruction set. Using emulation mode, individual CISC instructions may be emulated with RISC instructions. Thus, not all CISC instructions need to be directly supported in the CPU's hardware. Unsupported CISC instructions cause a jump to an emulation mode routine to emulate the unsupported CISC instruction. Upon completion of the emulation mode routine, control is returned to the CISC program with the next CISC instruction. These jumps to emulation mode can be predicted with a modified branch prediction apparatus.

BASIC PIPELINE FLOW

The diagram below indicates the progression of each instruction through one of the pipelines, with time increasing to the right by one clock for every stage, while subsequent instructions are listed below one another. Stages are abbreviated as D, A, C, M, and W, for decode, address generate, cache, memory, and write-back.

| Time (clocks):  | 1 | 2 | 3 | 4 | 5 | 6 |
|---|---|---|---|---|---|---|
| 1st Instruction: | D | A | C | M | W |   |
| 2nd Instruction: |   | D | A | C | M | W |
| 3rd Instruction: |   |   | D | A | C | M | W |

Thus the pipeline is:

DECODE ADDR GEN CACHE MEMORY WRITE-BACK

Instructions are first fetched by a fetch stage that is not shown. The decode stage decodes the instruction and dispatches it to the correct pipeline(s). An address of an operand is generated in the address generate stage, and a 2-clock cycle operand fetch is performed in the cache and memory stages. Alternately, a one-cycle operand fetch may be performed in the cache stage, and the memory stage may be a "Match" stage wherein the cache tag or TLB tag is compared to see if a match occurred and the operand fetched in the cache stage is valid. A write-back stage is normally included at the end of the pipeline when the results are written back into the register file and the condition codes are modified. Execution of an arithmetic-logic-unit (ALU) operation can be performed in any of the A, C, or M stages because the execution unit may be moved to any of these stages.

SUPER-SCALAR PIPELINES

Two or more pipelines as described above may be provided, allowing for two or more instructions to complete the pipeline in the same processor clock cycle. Each pipeline is adapted for processing a subset of the operations in an instruction set. The decode stage for each of the pipelines is combined into a decode and dispatch unit which is capable of decoding several instructions in one clock cycle. The decode unit examines the types of instruction that it has just decoded to determine which pipelines to send each instruction to. The decode and dispatch unit then dispatches each instruction to the designated pipeline(s). Additional decoding may be performed in the decode stage by each individual pipeline after the instruction has been dispatched.

Figure 2:
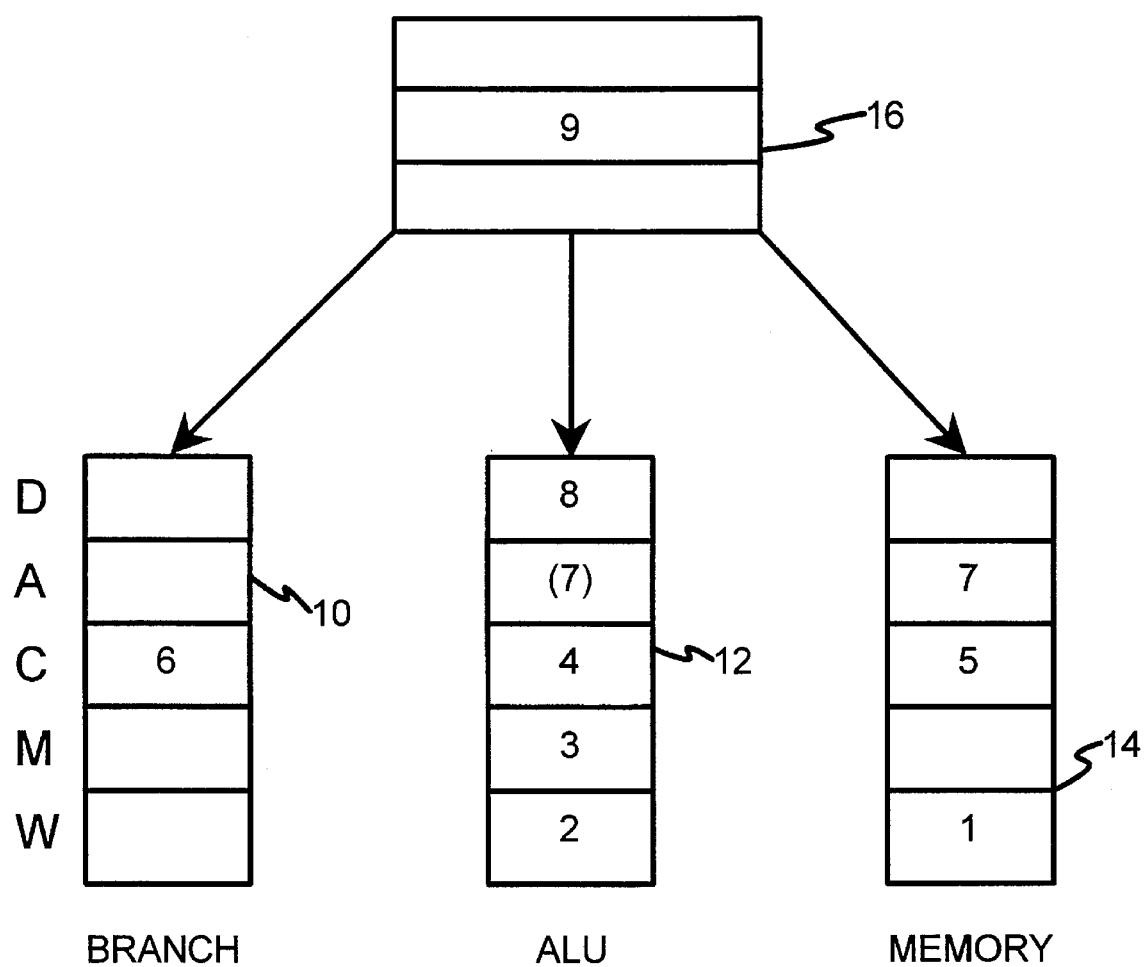
FIG. 2 shows three pipelines of a super-scalar processor: a branch pipeline, an ALU pipeline, and a memory pipeline.

FIG. 1 shows a stream of instructions to be processed. Instruction 1 is the first to be processed, followed by instruction 2, 3, and so forth. For this illustration, no taken branches are encountered so that the instructions are processed in sequential order. FIG. 2 shows that the super-scalar processor has three pipelines: a branch pipeline 10, an ALU pipeline 12, and a memory pipeline 14. Branch pipeline 10 is adapted for processing simple branch instructions and generating target addresses, and may contain branch prediction logic in the early stages such as the D stage. ALU pipeline 12 is designed to process arithmetic and Boolean logic instructions, and includes an ALU with an adder. Memory pipeline 14 is for processing load and store instructions. An address of an operand is generated in the A stage, and the operand is fetched or written to a cache in the C and M stages. Should the operand not be available in the cache, a secondary cache or main memory may have to be accessed, resulting in a pipeline stall until the operand is retrieved from the slower cache or main memory. A very fast cache could allow the M stage to be eliminated, while slower caches might require that an additional M2 stage be inserted into the pipeline.

Instructions are dispatched to one or more of the pipelines 10, 12, 14 by a dispatch unit 16 in the decode stage. Once an instruction is dispatched to the first (D) stage of a pipeline, it flows down the pipeline until the W stage is reached. The instruction completes processing when it leaves the W stage. Up to three instructions may complete the W stage in any clock cycle, and up to three instructions may be dispatched to the D stage at the start of the pipelines. Pipeline stalls, when an instruction does not advance to the next stage in the pipeline, may occur in any of the three pipelines 10, 12, 14. For simplicity, the preferred embodiment stalls all three pipelines when a stall occurs in any one pipeline. The stall only directly affects one stage in the three pipelines: a stall in the C stage of the memory pipeline will also stall the C stage of the branch and ALU pipelines, but not any other stages. Of course, upstream stages may have to be stalled because the instruction in the stalling stage did not advance. Empty stages can be filled if downstream stages are stalled.

FIG. 2 shows a point in time when instructions 1 and 2 are completing the pipeline, being in the final W stage. Instruction 1 is a memory instruction while 2 is an ALU instruction. Since instruction 3 is also an ALU instruction, no instruction was dispatched to the branch pipeline when instructions 1 and 2 were dispatched. Instead, instruction 3 had to wait to be dispatched until the next clock cycle. Instruction 4 is also an ALU instruction, so no instructions could be dispatched to the branch and memory pipelines when instruction 3 was dispatched. During the cycle that instruction 4 was dispatched, instructions 5 and 6 were also dispatched to the memory and branch pipelines. Thus three instructions were dispatched during the same clock cycle. These three instruction are called a group of instructions because all three instructions were dispatched during the same clock cycle. Also, the first dispatch was a group of two instructions, instructions 1 and 2.

Instruction 7 is a compound ALU-memory instruction requiring both the memory and the ALU pipelines. Instruction 7 could be a fetch-execute CISC instruction that first fetches an operand from memory, and then uses this fetched operand in an arithmetic operation. Because instruction 8 is also an ALU instruction, and not a branch instruction, instruction 8 must wait another clock cycle to be dispatched since instruction 7 is already using the D stage of the ALU pipeline. If instruction 9 is a simple branch instruction, it may also be dispatched with instruction 8. Likewise, if instruction 9 is a simple memory instruction, it may be dispatched to the memory pipeline during the same clock cycle that instruction 8 is dispatched. However, if instruction 9 is an ALU instruction, or a compound branch or memory instruction requiring the ALU pipeline, then instruction 9 must wait another clock cycle until instruction 8 clears the D stage of the ALU pipeline.

INSTRUCTION DECODE AND DISPATCH UNIT

Figure 3:
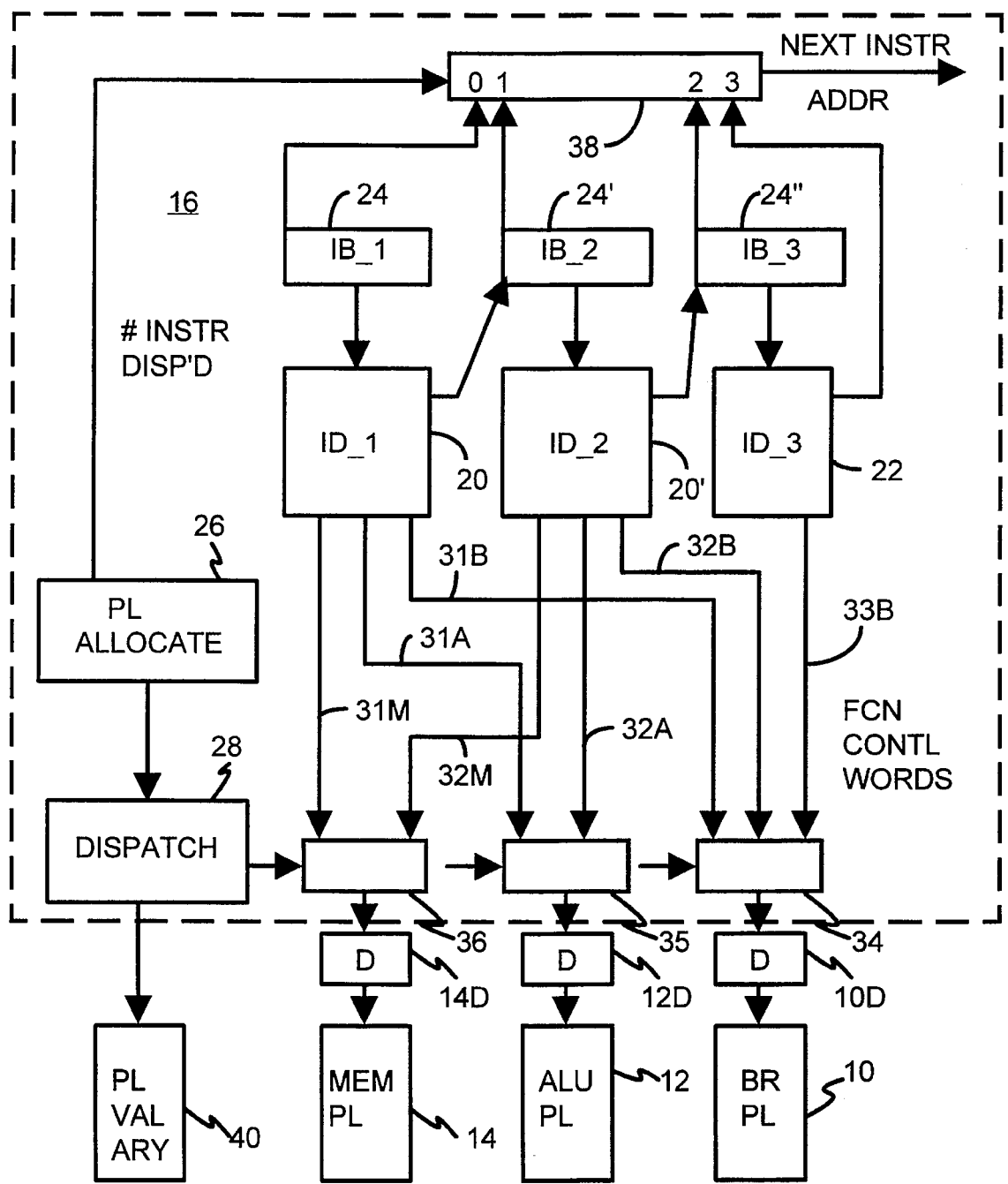
FIG. 3 shows the instruction decode and dispatch unit in more detail.

Instruction decode and dispatch unit 16 may decode and dispatch to the pipelines up to three instructions in any clock cycle, or group. FIG. 3 shows instruction decode and dispatch unit 16 in more detail. Three instruction decoders 20, 20', and 22 operate in parallel to decode up to three instructions in a single clock period. Instruction buffers 24, 24', 24" supply instruction decoders 20, 20', and 22 with bytes of instructions. Once the first instruction in instruction buffer 24 has been sufficiently decoded to determine the length of the first instruction, the exact starting location of the second instruction is transmitted to instruction buffer 24'. The second instruction in instruction buffer 24' may then be decoded by the second instruction decoder 20'. For RISC instructions, the instructions are fixed length, so decoding of the second instruction can begin immediately. When the second instruction has also been sufficiently decoded to determine the exact starting location of the third instruction is transmitted to instruction buffer 24". The third instruction in instruction buffer 24" may then be decoded by the third instruction decoder 22.

The exact starting locations of the second and third instructions in the group are also sent to mux 38, along with the starting location of the first instruction, and the starting location of the instruction after the third instruction, which is determined by the third instruction decoder 22. Mux 38 receives an indication of the number of instructions in the group, which were actually dispatched in the current clock cycle, either one, two, or three, or none if the pipelines were stalled. Mux 38 then selects one of these four instruction starting locations and sends it to the instruction fetch unit (not shown) to indicate the next group of instructions to fetch.

Third Decoder only Decodes Simple Branches

Because each successive instruction must wait for the preceding instruction to be sufficiently decoded to determine the starting location of the next instruction when operating in CISC mode, the decoding of the third instruction starts late in the clock period. Thus the third instruction decoder 22 must decode the third instruction very quickly. Rapid decoding is facilitated by limiting the types of instructions that are decodable by the third instruction decoder 22. Only simple branch instruction are decodable by the third instruction decoder 22. Complex branch instructions, such as CISC branches, are not decodable by the third instruction decoder 22, but must wait until the next clock cycle to be decoded by the first instruction decoder 20. Branches are chosen for decoding by the third instruction decoder 22 because of the difficulty caused by instruction stream discontinuities that taken branches produce. Thus executing branches as quickly as possible is desired. Allowing simple branches to be dispatched as the third instruction in a current clock period rather than having to wait until the following clock period allows these branches to be predicted and resolved one clock period earlier than if only two instruction decoders were provided. Decoding simple ALU or memory instructions in the third decoder would not be as effective since these types of instructions are less disruptive to processing than are branches. ALU and memory instructions are more difficult to decode in part because of the number of register operands used.

Each of the instruction decoders 20, 20', and 22 generate one or more function control words, one for each pipeline that a decoded instruction is dispatched to. The function control word indicates to the pipeline what functions to perform. The function control word, rather than the instruction opcode, is sent as the decoded instruction to the pipelines.

The function control words are different for each pipeline, because each pipeline can perform a different set of functions. Thus the branch pipeline 10 receives branch function control words 31B, 32B, and 33B from the first, second, and third instruction decoders 20, 20', 22. Likewise, the ALU pipeline receives ALU function control words 31B and 32B from the first and second instruction decoders 20, 20', while the memory pipeline receives memory function control words 31M and 32M from the first and second instruction decoders 20, 20'.

Muxes 34, 35, and 36 select one of the function control words for loading into the decode stages 10D, 12D, 14D of the branch, ALU, and memory pipelines 10, 12, 14. Muxes 34, 35, 36 are controlled by dispatcher 28. Dispatcher 28 will indicate to mux 34 whether a branch instruction is in either the first, second, or third instruction decoder 20, 20', 22. Likewise, dispatcher 28 will indicate to mux 35 whether an ALU instruction is in either the first or second instruction decoder 20, 20'. Dispatcher 28 will also indicate to mux 36 whether a memory instruction is in either the first or second instruction decoder 20, 20'. Dispatcher 28 will also indicate to the decode stages 10D, 12D, 14D whether or not to clock the selected function control word into the decode stage.

The decode stages 10D, 12D, 14D may perform additional decoding on the function control words during the decode clock cycle. On the following clock edge, the function control words in the decode stages 10D, 12D, 14D will normally be clocked down into the next stage, the A stage, of pipelines 10, 12, 14. Stalls in any of the stages of the pipelines may delay clocking the control word down one or more of the pipelines.

Multiple Pipelines used for Compound Instructions

Some compound instructions may require hardware or functional units that are present in two or more pipelines. For example, a compound CISC fetch-execute instruction first fetches an operand from memory or a cache, and then uses this fetched operand as an input in an ALU arithmetic operation. The memory pipeline must be used to fetch the operand, while the ALU pipeline must be used to perform the ALU arithmetic operation. Thus both the memory and the ALU pipelines are needed by the single compound CISC instruction. Some compound RISC instructions may also be relatively complex, requiring more than one pipeline for processing.

When such a compound instruction is decoded by one of the instruction decoders 20, 22', a determination of which pipelines are needed is made and sent to the pipeline allocate unit 26. Pipeline allocate unit 26 first looks at the pipelines needed by the first instruction decoded by instruction decoder 20. These pipelines needed by the first instruction are allocated to the first instruction. If any pipelines remain un-allocated, then the pipeline allocate unit 26 looks at the pipelines required by the second instruction decoded by the second instruction decoder 20'. If any of these pipelines required by the second instruction have already been allocated to the first instruction, then the second instruction cannot be dispatched in the current clock period. Instead mux 38 will select the starting address of the second instruction, which will be fetched again and loaded into the first instruction buffer 24 as the first instruction of the next clock period.

If the pipelines needed by the second instruction in the group are not yet allocated, then pipeline allocate unit 26 will allocate these needed pipelines to the second instruction. Finally, allocate unit 26 will look at the pipelines required by the third instruction decoder 22. Since the third instruction decoder 22 can only decode simple branches that use only the branch pipeline, the branch pipeline will be allocated to the third instruction if the branch pipeline is still un-allocated to the first or second instruction.

Pipeline allocate unit 26 will then indicate to dispatcher 28 which instruction will be sent to each pipeline. The possible combinations are shown in Table 1.

TABLE 1

| | Pipelines Allocated | | |
|---|---|---|---|
| Instruction Type | Branch | ALU | Memory |
| Simple Branch | V | | |
| Simple ALU | | V | |
| Simple F.P. | | V | |
| Simple Read/Write | | | V |
| Memory & Update | | N | V |
| Read-Execute | | N | V |
| Read-Execute-Write | | N | V |
| PUSH or POP | | N | V |
| CALL or RET | N | N | V |
| Move Immediate | | V | or V |
| Condition Register Boolean Branch | V | | |

In Table 1, "V" indicates the primary pipeline that the instruction is dispatched to, and that pipeline is thus marked as "valid". Secondary pipelines that an instruction is also dispatched to are marked as "N". By marking the secondary pipelines as "N", only one pipeline will be marked valid for each instruction at each stage. A count of the total number of instructions in the pipeline can simply be made by counting the V's in the pipeline and not counting the N's. However, the control words in pipelines marked "N" are valid, but are validated by the control word in the primary pipeline. Marking a pipeline as "N" prevents a following instruction from allocating it.

PIPESTAGE VALID BITS

Dispatcher 28 loads valid bits for the pipelines 10, 12, 14 into pipeline valid array 40. Pipeline valid array 40 contains an entry for each stage in the pipelines. Thus it has 5 entries: one for each of the D, A, C, M, and W stages. Each entry in pipeline valid array 40 indicates which pipelines have valid functional control words in the stage corresponding to that entry. A simple implementation would be to have a valid bit for each pipeline for each entry, or to have a second bit for each pipeline stage indicating if the pipeline is the primary or a secondary pipeline for that instruction.

The preferred implementation also encodes information about the sequence or order of instructions in that stage or group. The ALU pipeline stage could contain either the first or the second instruction in the group of instructions all dispatched in the same clock period. Likewise, the branch pipeline stage could contain either the first, second, or third instruction in the group. Table 2 shows the encoding of an entry in the pipeline valid array 40. A "don't care" in the encoding is designated as "x".

TABLE 2

Encoding of Pipline Valid Entry

| Encoding for Issue Time-Slot: | | | | |
|---|---|---|---|---|
| 1st | 2nd | 3rd | FP | Meaning |
| 00 | xx | x | x | No Instruction in 1st Issue Time-Slot |
| 01 | xx | x | 0 | Valid ALU in 1st Issue Time-Slot |
| 10 | xx | x | x | Valid Memory Op in 1st Issue Time-Slot |
| 11 | xx | x | x | Valid Branch in 1st Issue Time-Slot |
| 01 | xx | x | 1 | Valid F.P. Op in 1st Issue Time-Slot |
| xx | 00 | x | x | No Instruction in 2nd Issue Time-Slot |
| xx | 01 | x | 0 | Valid ALU in 2nd Issue Time-Slot |
| xx | 10 | x | x | Valid Memory Op in 2nd Issue Time-Slot |
| xx | 11 | x | x | Valid Branch in 2nd Issue Time-Slot |
| xx | 01 | x | 1 | Valid F.P. Op in 2nd Issue Time-Slot |
| xx | xx | 0 | x | No Instruction in 3rd Issue Time-Slot |
| xx | xx | 1 | x | Valid Branch in 3rd Issue Time-Slot |

The encodings of table 2 are for each of the three issue time-slots for up to three instructions in a group. The 1st issue time-slot is encoded for the type of instruction that was issued first, from the first instruction decoder 20. The 2nd issue time-slot is encoded for the second instruction decoded by the second instruction decoder 20', while the third issue time-slot is encoded for the third instruction decoded by the third instruction decoder 22. Thus the first and second issue time-slots can encode any type of instruction, while the third issue time-slot can only encode simple branch instructions.

An encoding of 01 11 0 0 would indicate an ALU instruction followed by a branch instruction, with no third instruction in the group. An encoding of 10 01 1 0 indicates a memory instruction, followed by an ALU instruction, and then a branch instruction, for a total of three instructions in the dispatched group. An encoding of 00 10 1 0 would not be valid because it encodes no valid instruction in the first issue time-slot but instructions in the second and third issue time-slots. Likewise an encoding of 10 00 1 0 is not valid because it encodes a valid instruction in the third issue time-slot but not in the second issue time-slot. Earlier issue time-slots are filled up before the later issue time-slots.

Floating Point Instructions Use ALU Interlock and Control

Table 2 also shows that floating point instructions can be encoded as a special type of ALU operation. When the ALU type of instruction is dispatched and encoded, the floating point bit indicates if the instruction is a normal ALU type or a floating point type. Although the floating point instructions are executed in a separate floating point data path, rather than the pipelines 10, 12, 14, floating point instructions occupy the ALU pipeline and appear to be regular ALU instructions. Thus floating point instructions can use the same control, interlock and by-pass select logic as ALU operations. This sharing of resources saves considerable logic and reduces complexity.

The disadvantage of using the ALU pipeline for floating point instructions is that an ALU and a floating point instruction cannot both be dispatched in the same clock cycle as part of the same group. However, this would not be a frequent occurrence.

Move Immediate Dispatched to Either ALU or Memory Pipeline

Move immediate is a very simple type of instruction that moves an immediate value from the instruction itself to a register in the CPU. Since this instruction is so simple, few pipeline resources are needed. These resources exist in both the ALU and the memory pipelines. Thus table 1 shows that the move immediate type of instruction can be dispatched to either the ALU or to the memory pipeline. When a move immediate instruction is decoded by the first instruction decoder 20, pipeline allocate unit 26 does not immediately allocate any pipelines to the first instruction. Instead, pipeline allocate unit 26 looks at the pipelines required by the second instruction. Pipelines are allocated for the second instruction first. Then the first instruction, the move immediate, is allocated. If the second instruction uses the memory pipeline, then the first instruction, the move immediate, is allocated the ALU pipeline. If the second instruction uses the ALU pipeline, then the first instruction, the move immediate, is allocated the memory pipeline. However, the second instruction cannot be allocated at all if the second instruction requires both the ALU and the memory pipeline.

Although the first move immediate instruction can be allocated out-of-order, with the second instruction being allocated first, the encoding of the pipeline valid bits follows the actual instruction order. Thus the first instruction, the move immediate, is encoded to the first issue time-slot, while the second instruction is encoded in the second issue time-slot.

Allowing the move immediate instruction to be allocated to either the ALU or the memory pipeline increases the number of times that multiple instructions can be dispatched, such as when two move immediates occur in sequence. This is a common occurrence, especially when initializing parameters in a program. In RISC mode, move immediate can be implemented as special versions of the add immediate and add immediate shifted instructions.

Dependent Instructions in a Single Group

Dependencies are common in an instruction stream. Dependent instructions require results from a previous instruction in the instruction stream. The dependent instruction must wait for the previous instruction to calculate its result and pass this result to the dependent instruction. In a pipelined system these dependencies often cause the pipeline to wait or stall for the result.

A conditional branch instruction is often dependent upon a result from a prior instruction. The prior instruction is typically an ALU instruction that sets flags or condition codes, indicating if the result was zero or negative. The conditional branch instruction must wait until the condition codes are set by the prior ALU instruction. A second example of a common dependency is a load instruction followed by a dependent ALU instruction. The ALU instruction needs an operand that was fetched from memory by the load instruction. The ALU instruction must wait until the operand is loaded before performing the ALU operation.

For both of these examples of dependencies, it is critical to know the order of the instructions in the instruction stream. One approach would be to dispatch the dependent instruction in the clock cycle after the prior instruction is dispatched. This would ensure that the instruction order is maintained. If both the prior and the dependent instruction are dispatched to different pipelines during the same clock cycle, then the dependency information must be stored. The encoding of the present invention stores the instruction order and dependency information, allowing both the dependent and the prior instruction to be dispatched during the same clock cycle. While a stall may still be required farther down the pipeline to wait for the dependency to resolve, performance is increased by the faster dispatch.

The encoding of pipeline valid bits by issue time-slot, rather than by physical pipeline, allows for instructions dispatched together in a group (during the same clock cycle) to have dependencies on each other. Since the encodings of pipeline valid bits contains information on the order of the instructions within the instruction stream, the CPU can easily extract this order information and determine the dependencies. These dependencies can exist not just from one pipeline stage to another stage, but within the same group occupying a single stage in each of the pipelines.

The pipeline bypass logic will examine the pipeline valid bits to determine the dependencies in the group of instructions. For example, the valid bits might indicate that a load instruction and an ALU instruction are both in the A stage, having been dispatched during the same clock cycle. When the ALU instruction is in the A stage of the ALU pipeline, to perform the ALU operation, and bypass logic detects that an ALU operand is from a register loaded by the load instruction in the A stage of the memory pipeline, then a dependency may exist. The bypass logic will then examine the pipeline valid bits to determine if a dependency exists. If the valid bits encoded are 01 10 xx 0, indicating that the ALU instruction is in the first issue time-slot, and the load instruction is in the second issue time-slot, then no dependency exists. However, if the valid bits encoded are 10 01 xx 0, indicating that the load instruction is in the first issue time-slot, while the ALU instruction is in the second issue time-slot, then a dependency exists. The ALU operation must wait until the load instruction loads the operand into the register file during the M stage.

Encoding information about the order of the instructions within a group also is useful when branches or exceptions occur. A taken branch, or a mis-predicted branch when branch prediction is used, will require that the instructions after the branch instruction be canceled because they are from the sequential instruction stream, while the program jumped to a target address instead of continuing along the sequential stream. Likewise, exceptions may require that all instructions after the instruction having the exception be canceled so that the exception may be processed.

Branch and exception logic will examine the pipeline valid bits to determine which instructions in the group with the branch or exception-causing instruction occur after the branch or exception-causing instruction. These instructions will be canceled, while the instructions occurring before the branch or exception-causing instruction will be allowed to continue through the pipelines.

Pipeline Valid Bits for Compound Operations

Compound instructions require two or more pipelines to process. When a compound instruction is dispatched, the encoding of the pipeline valid bits must be changed somewhat. Two additional bits for each entry are first and second compound dispatch bits. If a compound instruction is issued in the first issue slot by the first instruction decoder, then the first compound dispatch bit is set. If a compound instruction is issued in the second issue slot by the second instruction decoder, then the second compound dispatch bit is set. Additional bits in each entry code auxiliary issue slots which indicate the type of operation dispatched to the second pipeline by a compound instruction. These auxiliary issue slots are encoded in the same way that the first and second issue slots are encoded, as shown in Table 2. Since with three pipelines it is not possible to have two compound instructions dispatched in the same clock cycle, the auxiliary issue fields may be shared between the first and second issue slots.

FUNCTION CONTROL WORDS

Table 3 shows an encoding for the branch function control words that are generated by instruction decoders 20, 20', and 22. These branch function control words are sent to the branch pipeline 10 and clocked down the pipeline. Portions of the control words can be discarded once the information encoded in that portion has been used and is no longer needed. Thus a portion of the control word that encodes the type of ALU operation might not be needed once the ALU operation is performed. This portion can be discarded once the ALU operation has been completed, but before the instruction has completed the pipeline.

TABLE 3

Branch Function Control Words

| Control Word Encoding | Instruction Set | Opcode |
|---|---|---|
| 00 0000 0000 0000 | x86 or PPC | nop |
| 00 0000 0000 0001 | x86 or PPC | reset |
| 00 0000 0001 0000 | PowerPC ™ | sc |
| 00 0000 0010 0000 | PowerPC ™ | rfi |
| 00 0001 0111 cccc | x86 | Jcc 8-bit Displacement |
| 00 0001 10000 cccc | x86 | Jcc 16- or 32-bit Displ. |
| 00 0001 1001 cccc | x86 | SET Condition Code |
| 00 0001 1110 001x | x86 | RETurn |
| 00 0001 1110 1000 | x86 | CALL |
| x800 0001 1110 1001 | x86 | JUMP 16- or 32-bit Displ. |
| 00 0001 1110 1011 | x86 | JUMP 8-bit Displ. |
| 00 0001 1111 1111 | x86 | Indirect (Reg.) Branch |
| 00 0011 eeee eeee | x86 | Unsupported Instruction |
| 00 01dd dddp ppp0 | PowerPC ™ | Condition Reg Boolean |
| 00 01dd d00p ppp0 | PowerPC ™ | Move CR Register |
| 00 1Loo oooi ii ii | PowerPC ™ | Branch Conditional |
| 00 1L10 100x xxxx | PowerPC ™ | Branch |
| 01 0Loo oooi ii ii | PowerPC ™ | Branch CTR Reg |
| 01 1Loo oooi ii ii | PowerPC ™ | Branch LR Reg |
| 11 0001 0010 1100 | PowerPC ™ | Instr. Synch |

TABLE 3-continued

Branch Function Control Words

| Control Word Encoding | Instruction Set | Opcode |
|---|---|---|
| 11 00-m mmmm mmm1 | PowerPC ™ | Move to CR Reg |
| 11 0100 0000 0001 | PowerPC ™ | Move Reg to CR |

The following designations are used in Table 3 for fields within the control words that are used for immediate or select information:

| | |
|---|---|
| x = | Don't Care |
| cccc = | x86 Condition Code Select |
| eeee eeee = | Emulation Entry Point |
| pppp = | Boolean Function Select |
| d dddd = | Boolean Destination Bit |
| ddd = | Boolean Destination Field |
| i ii ii = | Select CR field to Evaluate for Branch |
| oo ooo = | Branch Function Select |
| L = | Update Link Register if set |
| m mmmm mmm = | Merge Mask for CR Merge Operation |

The function control word has the instruction set, x86 CISC or PowerPC™ RISC, indirectly encoded into it, along with the type of operation, and other specifics about the instruction. Thus there is no need to directly store an indication of the instruction set other than the encoding to indicate to the pipeline stages the functions to be performed. Some instructions, such as reset and nop, perform the same functions regardless of which instruction set the instruction decoded was from. Thus there is no need for an indication of the instruction set for these operations, and the instruction set is not encoded into the control words. Other functions will differ depending upon the instruction set. A CISC JUMP that examines the CISC condition codes performs a somewhat different function than a RISC branch conditional, which examines the RISC CR condition register. Thus two separate control words are encoded for the two separate functions performed by instructions from two different instruction sets.

The ALU and the memory pipelines also have function control words. Each pipeline has its own unique format and size for its function control word. The ALU pipeline in particular requires about 100 control-word encodings, many more than the branch pipeline because of the wide variety of functions that can be performed by the ALU. Some examples of the ALU function control words are shown in Table 4, while some examples of Memory function control words are shown in Table 5. The "E" encodes the OE bit indicating if the overflow bits in an exception register should be set, as for example, when multiply or divide is executing. The "R" bit is the record bit, which indicates if the flags or condition code registers should be updated by the operation.

TABLE 4

ALU Function Control Words

| Control Word Encoding | Instruction Set | Opcode |
|---|---|---|
| 0 E10000 1010 R | PowerPC ™ | add |
| 0 E01110 1011 R | PowerPC ™ | mulw |
| 0 000001 1100 R | PowerPC ™ | and |
| 0 010011 1100 R | PowerPC ™ | xor |
| 1 011100 0000 x | PowerPC ™ | andi (and immediate) |
| 1 011010 0000 x | PowerPC ™ | xori (xor immediate) |
| 1 01000x xx01 0 | x86 | ADD |
| 1 00100x xx01 0 | x86 | AND |
| 1 011010 xx01 0 | x86 | MOV |
| 1 110000 xx01 0 | x86 | ROL (rotate left) |

For Table 5, "sz" encodes the size of the operand—byte, half-word, word, or double word, "u" indicates update the address register, and "x" indicates that an index register is to be used to generate the address.

TABLE 5

Memory Function Control Words

| Control Word Encoding | Instruction Set | Opcode |
|---|---|---|
| 10010101010 | PowerPC ™ | lswi (load string word imm) |
| 00001101100 | PowerPC ™ | dcbst (data cache block store) |
| 10001101100 | PowerPC ™ | TLB synch |
| 0000ux01110 | PowerPC ™ | load word and zero |
| 0011ux01110 | PowerPC ™ | store byte |
| 1011ux01110 | PowerPC ™ | stfd (store fp double) |
| 0100sz11000 | x86 | read-execute |
| 0110sz11000 | x86 | read-execute-write |
| 0000sz11000 | x86 | loads-POP, MOV, RET |
| 1000sz11000 | x86 | stores-PUSH, MOV, CALL |

When an instruction is to set or clear flags in a condition code register, this information must also be generated and staged down the pipelines. A flag enable field may be attached to the function control word, or it may be a separate field. Since both RISC and CISC have corresponding flags, such as zero, carry, overflow, and sign flags, a single flags field can be used by instructions from either instruction set to enable updating these flags. Table 6 shows that the RISC flags OV, CA, LT, EQ correspond to the CISC flags OF (overflow), CF (carry), SF (sign), and ZF (zero). Thus the same bit in the flags field can be used for either a RISC or a CISC instruction. The type of instruction set does not have to be encoded.

TABLE 6

| Instruction Set | Flags field Enables | | | | | | | | Value | | | |
|---|---|---|---|---|---|---|---|---|---|---|---|---|
| RISC | OV | CA | CR | CR | CR | CR | LT | GT | EQ | OV | xx | xx | CA |
| CISC | OF | CF | SF | ZF | AF | PF | SF | xx | ZF | OF | AF | PF | CF |

INSTRUCTION DECODER FOR RISC AND CISC

Figure 4:
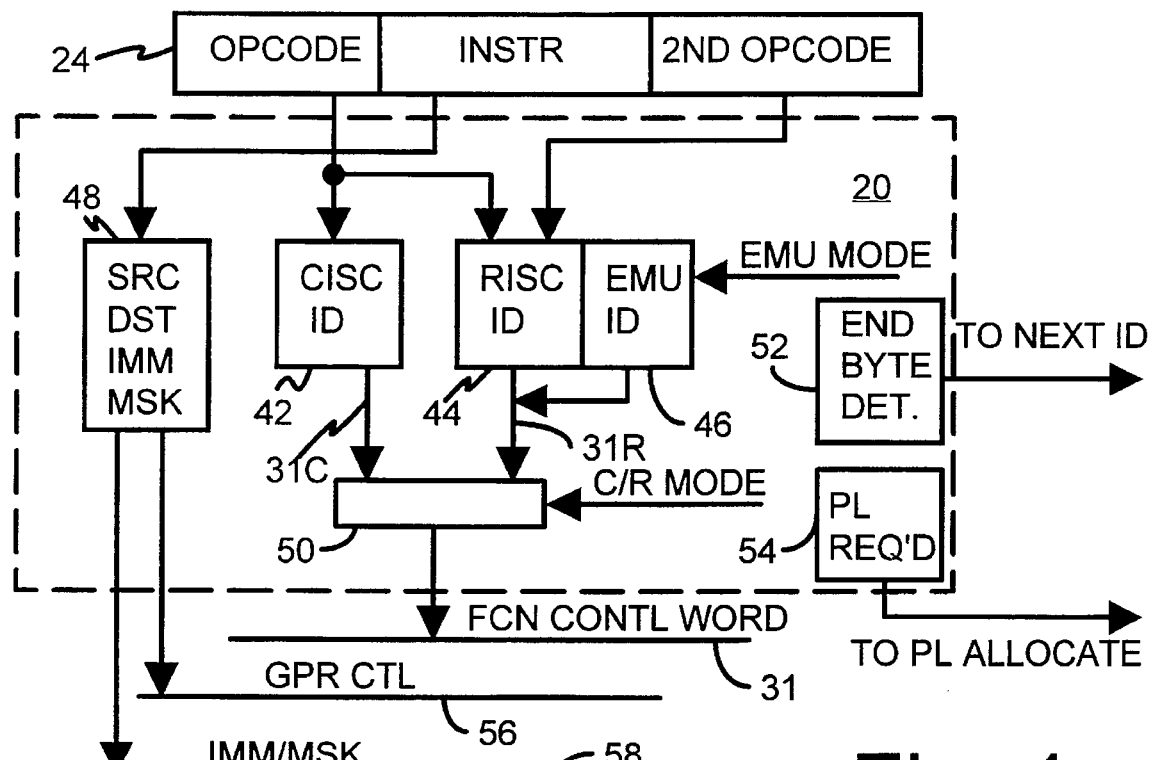
FIG. 4 shows the first and second instruction decoders.

FIG. 4 shows instruction decoder 20. A first or primary opcode field in instruction buffer 24 is sent to a CISC decoder 42 and a RISC decoder 44 for decoding the instruction's opcode. The opcode, as is well-known in the art, encodes the function or operation to be performed by the instruction, such as ADD, JUMP, or NOP. For some more complex RISC instructions, a secondary opcode field from instruction buffer 24 is also required to decode the instruction, and is therefore also sent to RISC decoder 44. A CISC instruction may have its primary opcode field in an entirely different location within the instruction buffer 24, or it may be a different number of bits in width. For x86 and PowerPC™, the primary opcode fields overlap and are thus shown in FIG. 4 as being the same field, although the field-widths differ.

The CISC decoder 42 decodes the primary opcode assuming that the instruction in instruction buffer 24 is a CISC instruction. Likewise the RISC decoder 44 decodes the primary opcode assuming that the instruction in instruction buffer 24 is a RISC instruction. The CISC and RISC instruction sets are substantially independent, having a substantially independent encoding of opcodes to functions or operations. Thus one of decoder 42, 44 will have an erroneous output. Each of decoder 42, 44 generates and outputs a function control word 31C, 31R from the opcode input to the decoders.

A mode bit in a machine state register (not shown) in the processor indicates which mode the processor is in: CISC or RISC mode. As described in the co-pending applications in more detail, the mode bit is set when CISC instructions are being processed, or cleared when RISC instructions are being processed. This mode bit, C/R Mode, is used to select either the control word 31C from the CISC decoder 42, or the control word from the RISC decoder 44. Multiplexer or mux 50 selects either control word 31C or 31R under control of the CISC/RISC mode bit from the mode register, and outputs the selected control word.

The first and second instruction decoder 20, 20' of FIG. 3 both output three function control words 31M, 31A, 31B, one control word for each of the memory, ALU, and branch pipelines. Multiple control words can be generated for a single instruction because a compound instruction may be dispatched to more than one pipeline. Each pipeline needs its own control word to instruct that pipeline of the operations to perform. Thus, while FIG. 4 has for simplicity shown a single mux 50, and a single function control word 31 being output, the preferred embodiment has three muxes 50 and outputs up to three function control words, 31M, 31A, 31B.

The RISC instruction set is extended to include special emulation-mode instructions which are useful in emulating CISC instructions. A special emulation instruction is a return-from-interrupt (rfi) instruction, which returns control to the CISC program that caused emulation mode to be entered. Thus the rfi instruction causes a switch from RISC emulation mode to CISC mode, and the CISC/RISC mode bit is set by the rfi instruction. These emulation instructions are decoded by an emulation decoder 46 which operates in conjunction with the RISC decoder 44. An emulation mode bit also stored in the machine state register enables the decoding of the emulation instructions.

Other information besides the opcode may be present in the instruction buffer 24. This information may include fields to identify which general-purpose registers to use as the sources or destination of an operation, immediate data such as a constant for use by an operation, or a mask field. The exact locations of these fields in instruction buffer 24 vary with the instruction as well as the instruction set. Field decoder 48 receives an indication of the type of instruction decoded by decoders 42, 44, and the CISC/RISC mode bit (not shown) and various portions of instruction buffer 24. Field decoder 48 then outputs source and destination register information onto bus 56, and immediate or mask information on bus 58. Alternately, mask data may be encoded directly into the function control word, as is shown in Table 3 for the PowerPC™ move to CR instruction (mtcrf).

End byte detect 52 receives information from the decoders 42, 44 about the type of instruction encoded by the opcode in instruction buffer 24. End byte detect 52 then determines the size of the instruction being decoded and the address of the next sequential instruction. This address is transmitted to the next instruction decoder, either 20' or 22 of FIG. 3, so the exact location of the opcode field of the second or third instructions can be determined, allowing decoding of the second and third instructions to begin.

Pipelines required unit 54 determines which pipelines are required by the instruction being decoded. It receives information on the type of instruction that was decoded from decoders 42, 44. This information can be similar to the entries in Table 1, identifying the general type of instruction rather than the exact instruction decoded. The pipelines required are sent to the pipeline allocate unit 26 and then to dispatcher 28 of FIG. 3.

Figure 5:
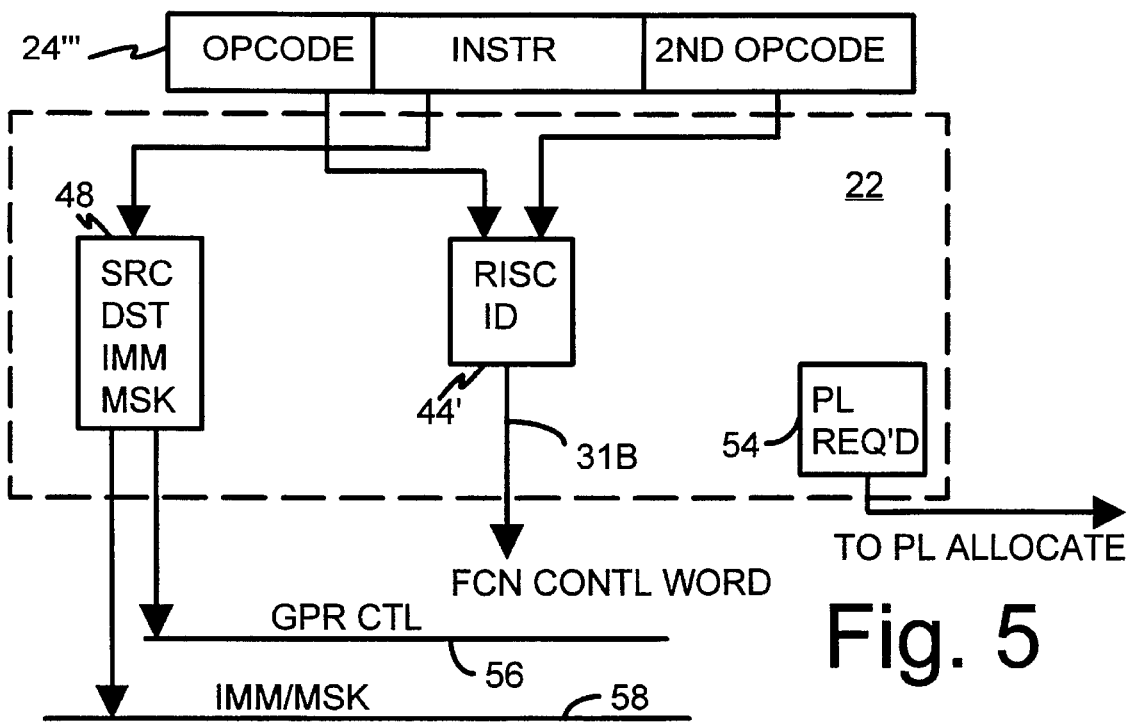
FIG. 5 shows the third instruction decoder.

The instruction decoders for the first and second instructions are almost identical, and designated 20 and 20' in FIG. 3. However, the third instruction decoder 22 is simpler because of the limited time available to decode the third instruction. FIG. 5 shows the third instruction decoder 22. There is not enough time to decode CISC instructions, so no CISC decoder or emulation mode decoder is included. RISC decoder 44' is a reduced decoder, capable of decoding only simple branch instructions. Only a single function control word 31B is generated for the branch pipeline. Otherwise, the third instruction decoder of FIG. 5 operates in a similar fashion to that described in reference to FIG. 4.

SWITCH TO ALTERNATE INSTRUCTION SET WITHOUT PIPELINE FLUSH

Since many instructions may be processed at the same time, the processor could restrict the pipelines to processing instructions from only one of the instruction sets at any one time. However, the invention does not impose this restriction, allowing instructions from the two instruction sets to be freely mixed in the pipelines. This is a tremendous advantage for executing short emulation routines of RISC instructions for some of the more complex CISC instructions. Purging the pipeline for every switch between instruction sets would severely reduce the performance of any program being partially emulated in the other instruction set. The expected frequency of switches to emulation mode is about 1% of the CISC instructions, and the average # of instructions in RISC mode between switches is 15–25. Flushing would add 6 to 8 more clocks for each CISC instruction emulated.

Instructions from two instruction sets may be dispatched together during the same clock cycle with a modification of the apparatus of FIGS. 3 and 4. A switch to the alternate instruction set is typically a branch or unconditional jump of some sort, such as a call or return-from-interrupt. Unsupported CISC instructions cause an entry to emulation mode, and thus act as an unconditional jump. For example, in Table 3 the functional control word encoded "00 0011 eeee eeee" is an x86 unsupported instruction and causes a jump to the emulation entry point identified in the "eeee eeee" field in the control word. Branch prediction logic can detect these types of branches that switch the instruction set. Such a branch prediction apparatus is described in more detail in the copending application for a "Dual-Architecture Exception and Branch Prediction using a Fault-Tolerant Target Finder Array", filed Aug. 31, 1994, U.S. Ser. No. 08/298,778, hereby incorporated by reference. When an instruction is fetched having a predicted branch instruction, the predicted target address is calculated at the same time as the fetch. Thus the target instruction can often be supplied to one of the instruction buffers during the same clock cycle as the branch instruction is delivered to the instruction buffer.

Thus a branch instruction could be loaded into the first instruction buffer 24 of FIG. 3, while the target instruction for that branch is loaded into the second instruction buffer 24'. The group of instructions dispatched could have both the branch instruction and its target, which are discontinuous.

The branch instruction can be a standard branch that does not switch to the alternate instruction set, or it could be a branch that does switch to the alternate instruction set. When the instruction set is to switch, then the target instruction must be decoded by a different decoder type than the branch instruction. For example, a CISC branch instruction could be loaded into the first instruction buffer 24, and would be decoded by the CISC instruction decoder 42 of FIG. 4. The CISC/RISC mode bit in the first instruction decoder 20 would be set to CISC mode, selecting the decoded CISC instruction. However, the second instruction buffer 24' is loaded with the target of the first (CISC) instruction. This target is a RISC instruction. Branch prediction logic recognizes that the branch instruction also causes a switch to the alternate instruction set. Thus branch prediction logic causes the CISC/RISC mode bit in the second instruction decoder 20' to switch to RISC mode. The RISC decoder 44 in the second instruction decoder 20' would be enabled, and the decoded RISC instruction would be used to generate the control word for the second instruction.

SHARED BYPASS AND INTERLOCK LOGIC

The bypass and interlock logic is shared between the two instruction sets. Synonyms are defined for the architectural registers of the two instruction sets. Thus the CISC register EAX is synonymous with the RISC register r0, while the CISC register ESI is synonymous with the RISC register r6. The field decoder 48 of FIG. 4 outputs the RISC-type registers even when CISC mode is being decoded. Thus field decoder 48 translates CISC registers into their RISC equivalents before being outputted to bus 58.

Table 7 shows the codes outputted by field decoder 48 of FIG. 4. A five-bit code in the register select field identifies which one of the 32 registers is to be accessed. For CISC mode, it is possible to perform a 32-bit access. When this happens, the register encoding is the same as for RISC mode. However, CISC mode can also access only 8 or 16 bits of a 32-bit register, and the 16-bits can be only the low half of the 32-bit register. The 8-bit access can only be to the low 16-bit of the 32-bit register, but can be either the first or second byte. These possibilities are encoded in the type field of Table 7. The register select field is also used to select floating point registers, and the type field indicates the size of the access, 32, 64, or 80 bits.

TABLE 7

Register Field ID Encoding

| Instruction Set | Type Field | Register Select Field | Meaning |
| --- | --- | --- | --- |
| RISC or CISC | 000 | nnnnn | 32-bit access to reg nnnnn |
| CISC | 001 | 000nn | 8-bit access to register nn (low byte) |
| CISC | 010 | 00nnn | 16-bit access to register nnn |

TABLE 7-continued

Register Field ID Encoding

| Instruction Set | Type Field | Register Select Field | Meaning |
| --- | --- | --- | --- |
| CISC | 011 | 000nn | 8-bit access to register nn (high byte) |
| RISC or CISC | 100 | 1xxxx | No register (immediate) |
| RISC or CISC | 100 | 0xxx | No register or immediate |
| RISC or CISC | 101 | nnnnn | 32-bit access to FP register nnnnn |
| RISC or CISC | 110 | nnnnn | 64-bit access to FP register nnnnn |
| RISC or CISC | 111 | 00nnn | 80-bit access to FP register nnnnn |

Leading zeros in the register select field of Table 7 indicate that only a few of the 32 registers may be selected. For example, while a 32-bit access may select any of 32 registers, and thus all 5 bits of the select field are used ($2^5$=32), for 8-bit accesses the upper 3 bits are always zero, because only registers 0–3 can be selected since the CISC architecture only defines four registers for 8-bit access. Likewise, only $2^3$=8 floating point registers are 80-bits wide; the other 24 floating point registers are only 64-bits wide.

Sharing the bypass and interlock logic and forming synonyms for the CISC registers allows for both RISC and CISC instructions to be in the pipelines at the same time. It is even possible for both RISC and CISC instructions to exist in the same group. This can occur if the RISC and CISC instructions are dispatched together during the same clock cycle. The shared bypass logic allows dependencies to exist between the two instruction sets and to be resolved. For example, a code sequence of a CISC instruction followed by a RISC and then another CISC instruction could be processed:

| Instruction Set | Instruction | RISC Register Equivalent |
| --- | --- | --- |
| CISC | POP ESI (ESP) | r6, (r4) |
| RISC | add r0, r6, r8 | r0, r6, r8 |
| CISC | ADD EAX, EAX | r0, r0 |

This code sequence has a dependency between the ESI value loaded by the CISC POP instruction and the register r6 value needed as a source in the RISC add instruction. Since ESI is translated to r6 by the field decoder 48, the bypass and interlock logic correctly identifies a data interlock for r6 between the CISC and RISC instructions. A second dependency exists for r0, which is a result of the RISC add instruction, and is a source needed by the CISC ADD instruction. Field decoder 48 translates the EAX register source of the CISC ADD instruction to register r0, allowing the bypass and interlock logic to detect the register r0 dependency between the RISC add and the CISC ADD instructions.

The sharing of architectural registers is described more fully in the copending application for a "Shared Register Architecture for a Dual-Instruction-Set CPU", filed Jul. 20, 1994, U.S. Ser. No. 08/277,962, now U.S. Pat. No. 5,481,693, hereby incorporated by reference.

INSTRUCTIONS FROM TWO SETS IN PIPELINE AT SAME TIME

The invention allows for having instructions from two instruction sets in the pipelines at the same time. Any or all of the three pipelines can have both RISC and CISC instructions in them at any time, and any group of instructions can have both RISC and CISC instructions in the group in the pipelines. There is not one pipeline for RISC and another pipeline for CISC; rather, all pipelines are used for all instruction sets and may freely mix instructions from the two instruction sets. This mixing is possible because of the single format for the function control words from either instruction set. Pipeline control is facilitated by converting CISC registers into their RISC register equivalents when the control words are being generated. This allows the bypass and interlock logic to be shared between the two instruction sets, and allows for instructions from more than one instruction set to be present in the pipeline at any time.

ALTERNATE EMBODIMENTS

Several other embodiments are contemplated by the inventor. For example, many encodings are possible for the function control words, and mask, immediate, or register information may or may not be encoded into the control words. Two pipelines could use a similar format for the control words. Different encodings for the pipeline stage valid bits are also contemplated. Auxiliary encodings for compound instructions can be achieved in a variety of ways. The number and functions of the pipelines may also be varied. Two or more ALU, branch, or Memory pipelines could be provided for, or two of the pipelines could be combined into one pipeline. The invention is not intended to be limited to the two instruction sets described in the preferred embodiment, nor to only two instruction sets, but it is anticipated that the teachings disclosed herein will enable those of skill in the art to design processors for multiple instruction sets beyond the RISC and CISC instruction sets described herein.

The various logic blocks described herein may be merged with other blocks. While an embodiment having separate CISC and RISC instruction decodes has been described, it is possible that these decoders could have some common logic functions and thus could be merged or combined together while still providing decoding of both instruction sets. The decoders may also be combined with the mux for selecting either the decoded RISC instruction or the decoded CISC instruction. The generation of the function control words could be partitioned into the separate RISC and CISC decoders, as described in the detailed description, or the function control words could be generated by a logic block after receiving some intermediate information from the RISC and CISC decoders. Additional or separate registers and bypass logic may be provided for RISC and CISC modes.

Branch prediction may be implemented in many ways and may have various capabilities. The invention does not depend upon any particular type of branch prediction, and may be implemented without branch prediction, although the benefits from using branch prediction are significant. The invention does allow for taken branches to be dispatched together with their targets. An instruction stream discontinuity may therefore exist within a group of instructions in a stage in the pipelines. The branch may be one that switches to another instruction set, and the invention allows a group of instructions in a stage in the pipelines to have instructions from multiple instruction sets. Thus instructions from different instruction sets may be dispatched together and freely mixed in the pipelines.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A central processing unit (CPU) for processing instructions from two separate instruction sets, the CPU comprising:

RISC instruction decode means for decoding instructions from a RISC instruction set, the RISC instruction set having a first encoding of operations;

CISC instruction decode means for decoding instructions from a CISC instruction set, the CISC instruction set having a second encoding of operations, the first encoding of operations substantially independent from the second encoding of operations;

instruction set indicating means for indicating an instruction set to be decoded, the instruction set indicating means having a RISC state indicating that the RISC instruction set be decoded, the instruction set indicating means having a CISC state indicating that the CISC instruction set be decoded;

select means, coupled to the RISC instruction decode means and the CISC instruction decode means, for outputting a control word, the control word generated from a decoding of an instruction from the RISC instruction set by the RISC instruction decode means when the instruction set indicating means is in the RISC state, the control word generated from a decoding of an instruction from the CISC instruction set by the CISC instruction decode means when the instruction set indicating means is in the CISC state, the control word having a third encoding of operations to control words, the third encoding of operations to control words being related to but substantially different from the first encoding and the second encoding; and execute means, coupled to the select means and receiving the control word, for executing operations, the execute means executing an operation decoded by the RISC instruction decode means when the instruction set indicating means is in the RISC state, the execute means executing an operation decoded by the CISC instruction decode means when the instruction set indicating means is in the CISC state, wherein RISC instructions and CISC instructions are directly decoded to the control word, the CISC instructions not being translated to RISC instructions, whereby instructions from both the RISC instruction set and the CISC instruction set are decoded into control words which are executed by the CPU.

2. The CPU of claim 1 wherein the execute means comprises:

a plurality of pipelines, each pipeline in the plurality of pipelines comprising a sequence of stages, each pipeline for executing a subset of operations encoded by the RISC instruction set and a subset of operations encoded by the CISC instruction set, each pipeline responsive to a particular format of the control word.

3. The CPU of claim 2 wherein the select means generates the control word and a secondary control word when a compound instruction is decoded, the compound instruction encoding two operations, a primary operation and a secondary operation, and wherein the plurality of pipelines comprises:

a first pipeline, receiving the control word, for executing the primary operation indicated by the control word; and a second pipeline, receiving the secondary control word, for executing the secondary operation indicated by the secondary control word, whereby compound instructions are decoded into two control words which are executed by two pipelines.

4. The CPU of claim 2 wherein the RISC instruction decode means and the CISC instruction decode means comprise a first decoder, the first decoder decoding a first instruction which encodes a first operation, the plurality of pipelines further comprising:

a first pipeline for executing a first subset of operations, the first subset of operations comprising a subset of operations encoded by the RISC instruction set and a subset of operations encoded by the CISC instruction set; and a second pipeline for executing a second subset of operations, the second subset of operations comprising a subset of operations encoded by the RISC instruction set and a subset of operations encoded by the CISC instruction set;

the CPU further comprising:

a second decoder for decoding a second instruction which encodes a second operation, the second decoder having a RISC instruction decode means for decoding RISC instructions and a CISC instruction decode means for decoding CISC instructions, the second decoder outputting a second control word, the second control word encoding an operation of a RISC instruction when the instruction set indicating means is in the RISC state but the second control word encoding an operation of a CISC instruction when the instruction set indicating means is in the CISC state; and dispatch means for allocating the plurality of pipelines, the dispatch means allocating the first pipeline to the first decoder if the first operation is an operation in the first subset of operations, the dispatch means allocating the second pipeline to the first decoder if the first operation is an operation in the second subset of operations, the dispatch means further allocating the first pipeline to the second decoder if the second operation is an operation in the first subset of operations and the first operation is outside of the first subset of operations, the dispatch means allocating the second pipeline to the second decoder if the second operation is an operation in the second subset of operations and the first operation is outside of the second subset of operations, whereby two RISC or CISC instructions are dispatched to the plurality of pipelines.

5. The CPU of claim 4 further comprising:

a pipeline valid array, loaded by the dispatch means, for indicating valid instructions in the plurality of pipelines, the pipeline valid array encoding if the first operation is in the first subset of operations, the second subset of operations, or not valid, the pipeline valid array further encoding if the second operation is in the first subset of operations, the second subset of operations, or not valid, whereby validity and order of operations in the plurality of pipelines is encoded and stored in the pipeline valid array.

6. The CPU of claim 5 wherein the first subset of operations comprises arithmetic-logic-unit (ALU) operations, the CPU further comprising a floating point pipeline for processing floating point operations, the dispatch means allocating both the floating point pipeline and the first pipeline to a floating point instruction decoded by the first decoder.

7. The CPU of claim 4 wherein the plurality of pipelines further comprises a third pipeline for executing a third subset of operations, the third subset of operations comprising operations encoded by the RISC instruction set and operations encoded by the CISC instruction set, the dispatch means allocating the third pipeline to the first decoder if the first operation is an operation in the third subset of operations, the dispatch means allocating the third pipeline to the second decoder if the second operation is an operation in the third subset of operations and the first operation is outside of the third subset of operations.

8. The CPU of claim 7 further comprising a third decoder for decoding a third instruction encoding a third operation, the third decoder having a RISC instruction decode means for decoding RISC instructions, the third decoder outputting a third control word encoding a RISC branch operation when the third instruction is a RISC branch instruction, the third decoder being disabled when the third instruction is not a RISC branch instruction; and wherein the dispatch means allocates the third pipeline to the third decoder if the third operation is a RISC branch operation and the first operation is outside of the third subset and the second operation is outside of the third subset, whereby a third instruction is dispatched to the third pipeline if the third instruction is a RISC branch instruction.

9. The CPU of claim 8 wherein the first subset of operations comprises arithmetic-logic-unit (ALU) operations, the first pipeline for executing ALU operations;

the second subset of operations comprises memory operations, the second pipeline for executing memory operations; and the third subset of operations comprises branch operations, the third pipeline for executing branch operations.

10. The CPU of claim 2 wherein the RISC instruction decode means and the CISC instruction decode means comprise a first decoder, the first decoder decoding a first instruction which encodes a first operation, the plurality of pipelines further comprising:

a first pipeline for executing a first subset of operations, the first subset of operations comprising a subset of operations encoded by the RISC instruction set and a subset of operations encoded by the CISC instruction set; and a second pipeline for executing a second subset of operations, the second subset of operations comprising a subset of operations encoded by the RISC instruction set and a subset of operations encoded by the CISC instruction set;

the CPU further comprising:

second instruction set indicating means for indicating an instruction set to be decoded for a second instruction, the second instruction set indicating means having a RISC state indicating that the RISC instruction set be decoded, the second instruction set indicating means having a CISC state indicating that the CISC instruction set be decoded;

a second decoder for decoding the second instruction which encodes a second operation, the second decoder having a RISC instruction decode means for decoding RISC instructions and a CISC instruction decode means for decoding CISC instructions, the second decoder outputting a second control word, the second control word encoding an operation of a RISC instruction when the second instruction set indicating means is in the RISC state but the second control word encoding an operation of a CISC instruction when the second instruction set indicating means is in the CISC state; and dispatch means for allocating the plurality of pipelines, the dispatch means allocating the first pipeline to the first decoder if the first operation is in the first subset of operations, the dispatch means allocating the second pipeline to the first decoder if the first operation is in the second subset of operations, the dispatch means further allocating the first pipeline to the second decoder if the second operation is an operation in the first subset of operations and the first operation is outside of the first subset of operations, the dispatch means allocating the second pipeline to the second decoder if the second operation is an operation in the second subset of operations and the first operation is outside of the second subset of operations, whereby both a RISC and a CISC instruction are dispatched to the plurality of pipelines.

11. The CPU of claim 10 wherein the second instruction set indicating means is coupled to the instruction set indicating means, if the first operation is outside of a subset of instruction-set-switching operations, the second instruction set indicating means is in the RISC state when the instruction set indicating means is in the RISC state, the second instruction set indicating means is in the CISC state when the instruction set indicating means is in the CISC state;

if the first operation is in the subset of instruction-set-switching operations, the second instruction set indicating means switches to the RISC state when the instruction set indicating means is in the CISC state, the second instruction set indicating means switching to the CISC state when the instruction set indicating means is in the RISC state, whereby the second decoder switches to decoding an alternate instruction set when an instruction-set-switching instruction is decoded by the first decoder.

12. The CPU of claim 11 wherein the first and second instructions are dispatched within a single clock period, whereby a CISC and a RISC instruction are dispatched during the single clock period.

13. The CPU of claim 1 further comprising:

field decode means, receiving RISC instructions from the RISC instruction set and receiving CISC instructions from the CISC instruction set, for decoding source and destination fields which indicate registers in the CPU, the field decode means coupled to the instruction set indicating means, the field decode means outputting codes, including source codes and destination codes for registers accessible to the RISC instructions when the instruction set indicating means is in the RISC state, the field decode means converting codes for registers accessible to CISC instructions into codes for registers accessible to RISC instructions when the instruction set indicating means is in the CISC state, whereby a single set of register codes is used by RISC instructions and CISC instructions.

14. The CPU of claim 13 further comprising bypass and interlock control means, receiving the codes for registers from the field decode means, for bypassing a result from a prior instruction to a source for a current instruction when a destination code for the prior instruction matches a source code for the current instruction, wherein the current instruction has a dependency to the prior instruction when the destination code for the prior instruction matches the source code for the current instruction, and wherein the prior instruction and the current instruction belong to different instruction sets, whereby a dependency may be detected between instructions from different instruction sets.

15. The CPU of claim 4 wherein the first decoder further comprises means for detecting a move immediate instruction, the move immediate instruction encoding a move immediate operation, both the first subset of operations and the second subset of operations including the move immediate operation, the first pipeline for executing the move immediate operation and the second pipeline for executing the move immediate operation;

and wherein if a move immediate instruction is detected by the means for detecting the dispatch means allocates the first pipeline to the second decoder if the second operation is an operation in the first subset of operations, the dispatch means allocates the second pipeline to the second decoder if the second operation is an operation in the second subset of operations, the dispatch means further allocates the first pipeline to the first decoder if the first operation is an operation in the first subset of operations and the second operation is outside of the first subset of operations, the dispatch means allocates the second pipeline to the first decoder if the first operation is an operation in the second subset of operations and the second operation is outside of the second subset of operations, whereby the second instruction is dispatched to the plurality of pipelines before the first instruction is dispatched when a move immediate instruction is detected in the first decoder.

16. A microprocessor for processing instructions from two separate instruction sets, the microprocessor comprising: CISC RISC instruction decode means for decoding instructions from a RISC instruction set, the RISC instruction set having a first encoding of operations, the RISC instruction decode means generating a first control word encoding an operation decoded by the RISC instruction decode means;

CISC instruction decode means for decoding instructions from a CISC instruction set, the CISC instruction set having a second encoding of operations, the first encoding of operations substantially independent from the second encoding of operations, the CISC instruction decode means generating a second control word encoding an operation decoded by the CISC instruction decode means;

select means, coupled to the RISC instruction decode means and the CISC instruction decode means, for selecting either the first control word from the RISC instruction decode means or the second control word from the CISC instruction decode means;

instruction set indicating means for indicating an instruction set to be decoded, the instruction set indicating means having a first state indicating that the RISC instruction set be decoded, the instruction set indicating means having a second state indicating that the CISC instruction set be decoded;

the instruction set indicating means coupled to the select means, the select means selecting the first control word from the RISC instruction decode means when the instruction set indicating means is in the first state indicating that the RISC instruction set be decoded, the select means selecting the second control word from the CISC instruction decode means when the instruction set indicating means is in the second state indicating that the CISC instruction set be decoded;

the first control word and the second control word both having a third encoding of operations to control words, the third encoding of operations to control words being related to but substantially different from the first encoding and the second encoding; and execute means, coupled to the select means and receiving first control words and second control words, for executing operations, the execute means executing the operation decoded by the RISC instruction decode means when the first control word is received from the select means, the execute means executing the operation decoded by the CISC instruction decode means when the second control word is received from the select means, whereby instructions from both the RISC instruction set and the CISC instruction set are decoded into control words which are executed by the microprocessor.

17. The microprocessor of claim 16 wherein the execute means comprises:

a plurality of pipelines, each pipeline in the plurality of pipelines comprising a sequence of stages, each pipeline for executing a subset of operations encoded by the RISC instruction set and a subset of operations encoded by the CISC instruction set, each pipeline responsive to a particular format of control words.

18. A method for simultaneously processing instructions from a plurality of instruction sets in a processor having a plurality of pipelines, the method comprising:

decoding a RISC instruction in a RISC instruction decoder and determining an operation encoded by a first opcode in the RISC instruction using a first encoding of operations to opcodes for a RISC instruction set;

allocating at least one pipeline in the plurality of pipelines to the RISC instruction, the at least one pipeline having a functional unit for performing the operation encoded by the first opcode;

generating at least one control word for the RISC instruction, the at least one control word for indicating to the functional unit to perform the operation encoded by the first opcode;

transmitting the at least one control word to the at least one pipeline;

executing the operation encoded by the first opcode in the at least one pipeline;

decoding a CISC instruction in a CISC instruction decoder and determining an operation encoded by a second opcode in the CISC instruction using the first encoding of operations to opcodes for the RISC instruction set when the RISC instruction is outside of a subset of instructions that change an instruction set being processed, but determining the operation encoded by the second opcode in the CISC instruction using a second encoding of operations to opcodes for the CISC instruction set when the RISC instruction is within the subset of instructions that change the instruction set being processed;

allocating a second pipeline in the plurality of pipelines to the second instruction, the second pipeline having a second functional unit for performing the operation encoded by the second opcode, the second pipeline being a different pipeline than the at least one pipeline;

generating a second control word for the CISC instruction, the second control word for indicating to the second functional unit to perform the operation encoded by the second opcode;

transmitting the second control word to the second pipeline; and executing the operation encoded by the second opcode in the second pipeline;

whereby instructions from a plurality of instruction sets are processed by a plurality of pipelines.

19. The method of claim 18 wherein the at least one control word is transmitted to the at least one pipeline and the second control word is transmitted to the second pipeline during a single clock cycle, whereby the RISC and CISC instruction are dispatched within the single clock cycle.

20. The method of claim 19 wherein the first encoding of operations to opcodes for the RISC instruction set is substantially independent from the second encoding of operations to opcodes for the CISC instruction set.

21. The method of claim 20 wherein the subset of instructions that change the instruction set being processed comprises a plurality of unsupported complex instructions in the RISC instruction set that are not decodable by the RISC instruction decoder.

* * * * *